March 21, 1950          H. FRIEDMAN          2,500,941
GEIGER-MUELLER COUNTER STRUCTURE
Filed March 7, 1946
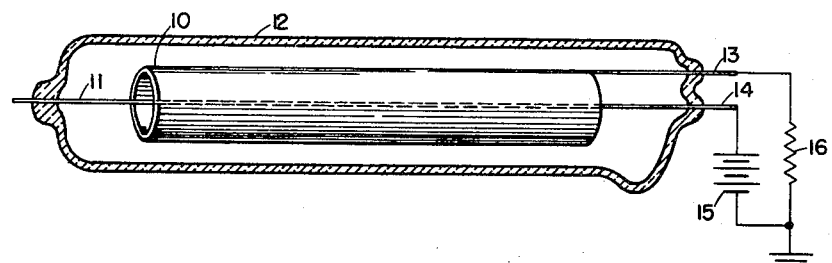
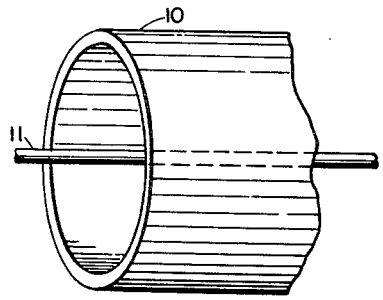 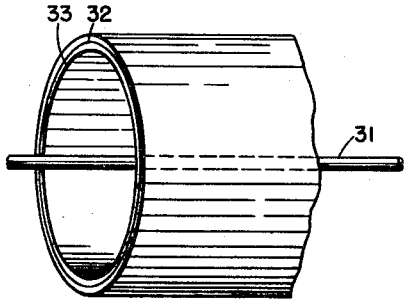
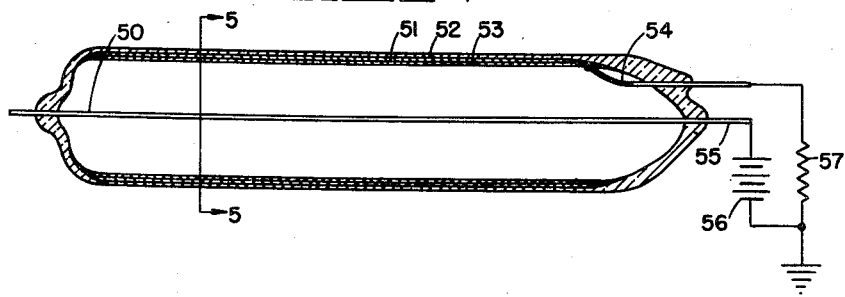
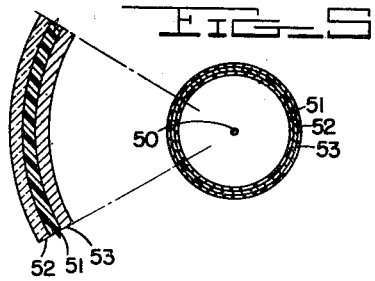
Inventor
HERBERT FRIEDMAN
By M. C. Hayes
Attorney Patented Mar. 21, 1950

2,500,941

UNITED STATES PATENT OFFICE 2,500,941

GEIGER-MUELLER COUNTER STRUCTURE

Herbert Friedman, Arlington, Va.

Application March 7, 1946, Serial No. 652,746

7 Claims. (Cl. 250—27.5)

(Granted under the act of March 3, 1883, as amended April 30, 1928; 370 O. G. 757)

This invention relates to Geiger-Mueller counter tubes, and more particularly to a special Geiger-Mueller counter tube particularly useful as the detecting element of a radiographic exposure meter.

An object of this invention is to provide a Geiger-Mueller counter tube having an output which is directly proportional to the blackening of a photographic plate which would be obtained when exposed to radiations of an equivalent intensity.

A further object of this invention is to provide a Geiger-Mueller counter tube which has universal application as a detector for all types of penetrating radiations, including X-rays, beta, and gamma radiations.

Further objects of this invention reside in the details of construction of the cathode element and its combination with other parts in a Geiger-Mueller counter tube.

In radiographic exposure meters of the type depending upon the ionization effect of X-rays, the Geiger-Mueller counter tube is frequently used as the detector for the quantity of radiation striking a sensitized film surface. This detecting element is combined with a circuit for the amplification of the ionizing pulses together with an indicator which may be calibrated to show the average rate at which ionizations are occurring in the Geiger-Mueller tube. The reading thus obtained is an indication of the intensity of the X-ray source, and consequently serves as a guide in determining the time for which a particular X-ray film should be exposed to radiation. The reading thus obtained must, however, be evaluated in the light of knowledge regarding the type of films used, the "hardness" of the X-rays, which is a function of the tube construction and applied voltage, and the contour of the object to be photographed. As a result, recourse must be had to tables of empirical data for the proper interpretation of the factors involved in estimating the optimum exposure time. Even under these conditions no truly accurate comparison is possible between the blackening of film and the indication of the exposure meter.

The lack of a direct relationship between the Geiger-Mueller counter output and the blackening of a photographic plate is due to certain essential differences between the two processes. Photographic blackening is essentially a chemical effect produced by quanta of radiation striking the sensitized photochemical substance in the film. Certain photosensitive silver compounds, such as the silver halides, are decomposed by radiation into metallic silver and the corresponding halogens. The number of molecules of the compound decomposed in a given area of a photographic plate determines the degree of blackening of this area, since the silver particles produced thereby are, in the aggregate, the dark portion of the photographic negative when developed.

The degree and rate of blackening are affected by all conditions which control the radiation impinging upon the sensitive surface, such as the intensity of the radiating source, the medium through which the radiations must pass, and the distance of the film from the source. A further element affecting a sensitized plate is the frequency spectrum of the radiation. Every photosensitive chemical compound has its own particular frequency response curve, including certain frequencies which are relatively ineffective in producing decomposition, while certain other frequencies produce a relatively strong chemical reaction. The frequency response curve for a given compound is determined primarily by the metallic ion, and is affected to a much smaller degree by the halide. It depends thereby upon the atomic composition of the metal itself, each metal possessing a particular absorption spectrum.

The Geiger-Mueller counter tube depends for its action on the effect of radiation upon the cathode structure of the tube, since the cathode liberates electrons to a degree determined by the atomic composition of the electrode structure. The output of a Geiger-Mueller counter tube, therefore, is affected by the frequency of radiation impinging upon the cathode structure. In consequence it may be seen that the conventional Geiger-Mueller counter tube, when used as the detecting element of an exposure meter, does not give an output which corresponds in any systematic fashion to the blackening of a photographic plate.

This invention provides novel means for obtaining a direct relationship between the blackening of a photographic plate and the number of pulses produced by a Geiger-Mueller tube when located in a position corresponding to that of the plate, regardless of the character and frequency spectrum of the radiation. This approximate one-to-one relationship is accomplished by so constructing the Geiger-Mueller tube that its cathode corresponds, in atomic composition, to the photosensitive emulsion of the film. All photosensitive halides, such as silver chloride, bromide, or iodide, may be utilized as cathode surfaces in this manner. The photosensitive silver halide is employed as the active cathode surface and has relatively low conductive properties. Consequently the halide particles must be combined with a binder of conductive material or a reinforcing surface of a metal in order that the electrical impulse produced by the photoelectric effect of the impinging radiation may be applied to the counting circuit. If a laminated construction of halide and metal is used for the cathode, the metal should form an extremely thin inner cathode layer nearest the anode, so that radiations entering the tube from the exterior will strike the silver halide surface and cause this surface to emit electrons which are then attracted inward through the metal toward the anode and are collected on the inner conductive cathode surface to produce an electrical impulse in the tube.

For a better understanding of the present invention, reference may be had to the accompanying drawings wherein:

Figure 1 is a schematic drawing of a typical Geiger-Mueller counter tube;

Figure 2 is an enlarged drawing showing a portion of the cathode and anode section as shown in Figure 1, illustrating one embodiment of the invention;

Figure 3 is an enlarged drawing showing the same tube elements as Figure 2 but illustrating a second embodiment of the invention;

Figure 4 is a cross sectional drawing of a Geiger-Mueller counter tube showing a further alternative embodiment of the invention;

Figure 5 is a cross sectional drawing of the Geiger-Mueller counter tube shown in Figure 4 but taken along the line 5—5.

In general it may be stated that Geiger-Mueller tubes are constructed as illustrated in Figure 1, wherein 10 represents a cathode cylinder coaxially arranged with respect to anode 11, the entire structure enclosed in the radiation permeable envelope 12. Electrical connections are made to associated parts of the counter circuit through leads 13 and 14. Battery 15 represents a potential source, while resistance 16 represents the input resistance of a counting circuit, across which the pulses to be counted appear.

One embodiment of this invention comprises forming the entire cathode cylinder of a silver halide in a matrix of conductive material, which material can be formed into sheets or relatively thin layers. The preparation of a cylindrical cathode surface comprising a photosensitive silver halide may be accomplished by rolling the crystalline material into a sheet at an elevated temperature. The sheet of material produced thereby may be cut to the proper size and assembled in the form of a cylinder.

A second method for producing a layer of conductive silver halide is to incorporate the silver compound with a conductive binder material and press the resultant paste into sheets. Such a binder may be any plastic coating or film-forming material such as polyvinyl chlorides, polyvinyl acetates, polyethylenes, polybutenes, polystyrene, or cellulosic film formers such as methyl and ethyl cellulose. It is necessary only that the binder used be one which has sufficient strength to hold the halide and conductive material together in sheet form and that it give no photoelectric reaction when exposed to the radiation being measured. A typical composition for a cathode paste would consist of about 50 parts of silver bromide finely divided and mixed with about 30 parts of finely divided carbon, the mixture being dispersed in a solution of about 20 parts of polystyrene in toluene to a uniform paste and then knifed out into sheets about 4 millimeters thick and dried. The cathode cylinder may be formed directly by molding, however, if the silver halide is incorporated with a conductive plastic and pressed into the desired shape. This construction is shown in greater detail in Figure 2, the parts of which are numbered correspondingly with respect to Figure 1.

A further embodiment of the invention comprises providing a backing of silver, aluminum, or similar conductive metal to support a layer of a silver halide, thus strengthening the silver halide layer and holding it firmly in place. Figure 3 illustrates this application, in which 31 represents the anode, 32 the silver halide lamination, and 33 the layer of silver, aluminum, or other conductive material. The metallic layer is applied by sputtering or electrodepositing a film within the previously formed cathode cylinder. The tube, after insertion of the cathode and anode elements, requires a gaseous filling comprising two types of materials, one to provide the ionizing medium when subjected to penetrating radiations, the other to quench the ionization and to stop the gaseous discharge. The nature of the gaseous filling determines both the sensitivity of the tube with regard to a particular type of radiation and the speed with which the gaseous discharge is quenched. Thus any of the inert gases such as argon, krypton, neon, xenon, or helium which are subject to ionization as a result of penetrating radiations may be used as the ionizing medium. Each of these gases is selectively sensitive to particular radiation spectra. Argon, for example, may be used where relatively "hard" radiations are to be detected, whereas krypton is especially suitable for "soft" X-rays. The second component of the gaseous filling is the quenching vapor which deionizes the inert gas and terminates the gaseous discharge after firing the tube. This component may be one of several organic vapors which have been found experimentally to be effective in performing the deionizing function. Alcohol, petroleum ether, and certain methylene halides are among the principal quenching vapors which may be employed. It is to be noted that the effectiveness of a particular quenching compound is controlled, in part, by the inert gas of the tube and by the chemical composition of the cathode. In this invention the cathode structure will comprise a silver halide and, in consequence, a preferable quenching vapor would be a methylene compound of the same halide as that contained in the cathode itself. Thus a Geiger-Mueller counter tube having a cathode of silver bromide should have as its quenching vapor a small quantity of methylene bromide. In this way the photo-chemical decomposition of the silver bromide will result in the establishment of an equilibrium between the quenching vapor and the decomposition products which will maintain the stability of the tube over a long period of time. The tube is coupled to an electronic counting and indicating circuit which shows the average pulse rate of the counter.

Figures 4 and 5 illustrate a further embodiment of the invention in which the photosensitive silver halide and a conductive material are deposited on the interior of the envelope, thus eliminating the need for a separate cathode structure. In these figures the anode 50 is a conventional wire. The cathode structure, however, comprises a photosensitive silver halide 51 which is deposited directly on the interior of the tube envelope 52 which is usually glass. It is preferable to use materials for the envelope which are highly permeable to the radiation being measured. Generally, light metals such as beryllium and aluminum have low absorptivity and can be used for metal envelopes. When using glass for the envelope, a borosilicate type of glass is preferable since it absorbs penetrating radiation less than lead glass. Upon the interior surface of this material a further layer 53 of a conductive material is deposited. A lead 54 is connected to the conductive coating and provides a terminal for the cathode element, as does external anode lead 55. The battery 56 represents a potential source, while resistance 57 represents the input resistance of a counting circuit, across which the pulses to be counted appear. Figure 5 represents a cross section of the tube in Figure 4 taken through the section 5—5 and with parts numbered accordingly.

In preparing the tube illustrated in Figures 4 and 5 the internal surface of the glass tube to be used as the envelope for the Geiger-Mueller counter is first carefully cleaned with a cleaning solution, such as a heated mixture of concentrated sulfuric acid and potassium dichromate, after which the tube is thoroughly rinsed with distilled water.

In depositing the layer of silver halide on the glass tube the compound may be mixed with a binder such as shellac and applied, or an aqueous solution of a water soluble silver compound such as the nitrate may be applied to the glass surface and then exposed to a gaseous halogen, and the silver halide will be precipitated on the surface. Silver or aluminum may be deposited on the surface of the silver halide by sputtering from an electric arc or vaporizing the metal and condensing a film. A non-metallic conductive coating such as aquadag may be applied instead, however, by painting on the silver halide surface.

When a Geiger-Mueller counter tube so constructed is to be used as the detector of a radiographic exposure meter it should be supported in such a fashion with respect to the radiation source that it receives radiation of the same intensity as that which will be received by a photographic plate. This may be accomplished by placing the counter tube in film position in a radiographic apparatus. A radiation indication will be obtained on the counter indicator which may be correlated with the blackening of a particular type of film. Once relationship is established between the counter reading using the Geiger-Mueller tube described in this invention and the blackening of a film, no further corrections need be made for the changing voltages applied to the X-ray tube which affect the X-ray capacities of various subjects between the radiation source and the photographic film. A Geiger-Mueller counter tube so constructed is useful for all types of X-ray photography, and gamma ray photography as well.

It will be apparent to one skilled in the art that my invention is by no means limited to the particular organization shown and described, and that many modifications may be made without departing from the scope of this invention as set forth in the appended claims. The invention described herein may be manufactured and used by or for the Government of the United States of America for governmental use without the payment of any royalties thereon or therefor.

Having described my invention what I claim as new and desire to secure by Letters Patent of the United States is:

1. A detecting element for a radiographic exposure meter comprising, a Geiger-Mueller counter having a coaxial anode and a cathode, an envelope therefor, and a gaseous filling of substantial pressure therein, said cathode having an active surface containing a photosensitive silver halide.

2. A Geiger-Mueller counter tube comprising, a coaxial anode and cathode, an envelope therefor, and a gaseous filling of substantial pressure therein, said cathode having an active surface containing silver chloride.

3. A Geiger-Mueller counter tube comprising, a coaxial anode and cathode, an envelope therefor, and a gaseous filling of substantial pressure therein, said cathode having an active surface containing silver bromide.

4. A Geiger-Mueller counter tube comprising, a coaxial anode and cathode, an envelope therefor, and a gaseous filling of substantial pressure therein said cathode having an active surface containing silver iodide.

5. A Geiger-Mueller counter tube comprising, a coaxial anode and cathode, an envelope therefor, and a gaseous filling therein comprising a mixture of an inert gas and a quenching halide vapor, said cathode having an active surface which comprises essentially a photosensitive metallic halide.

6. A laminated cathode structure for a Geiger-Mueller counter comprising, as an active surface therefor, a layer of a material which corresponds chemically to a photographic metallic halide film surface and a layer of a conductive reinforcing material to support said active layer.

7. A Geiger-Mueller counter tube comprising, a coaxial anode and cathode, an envelope therefor, and a gaseous filling therein, said cathode having an active surface which comprises essentially a photosensitive metallic halide, and said gaseous filling containing an organic halide, said organic halide containing the same halogen as that contained in the photosensitive metallic halide of the cathode surface.

HERBERT FRIEDMAN.

REFERENCES CITED

The following references are of record in the file of this patent:

UNITED STATES PATENTS

| Number | Name | Date |
|---|---|---|
| 2,031,864 | Teves et al. | Feb. 25, 1936 |
| 2,351,028 | Fearon | June 13, 1944 |
| 2,398,934 | Hare | Apr. 23, 1946 |
| 2,427,663 | Mateosian et al. | Sept. 23, 1947 |

OTHER REFERENCES

Locher: Physical Review, vol. 42, pp. 525–546, Nov. 15, 1932.

Toy: Philosophical Magazine, v. 3, 1927, pp. 482–495.